Oct. 13, 1953    H. W. WOOD    2,655,425
ELECTROCARDIOGRAPH
Filed Feb. 25, 1950    2 Sheets-Sheet 1
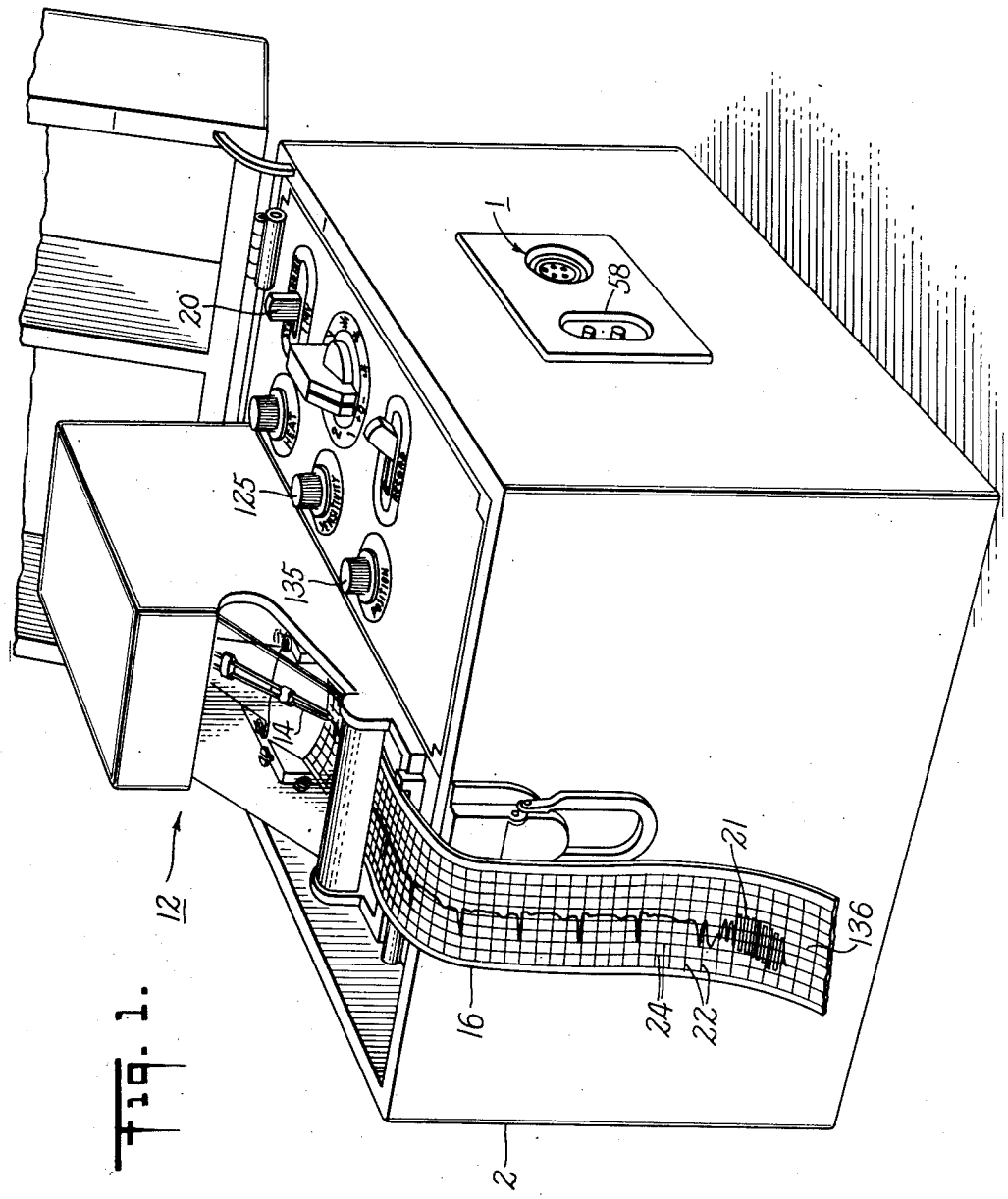
INVENTOR
*Harvey W. Wood*
BY
*Curtis, Morris + Safford*
ATTORNEYS

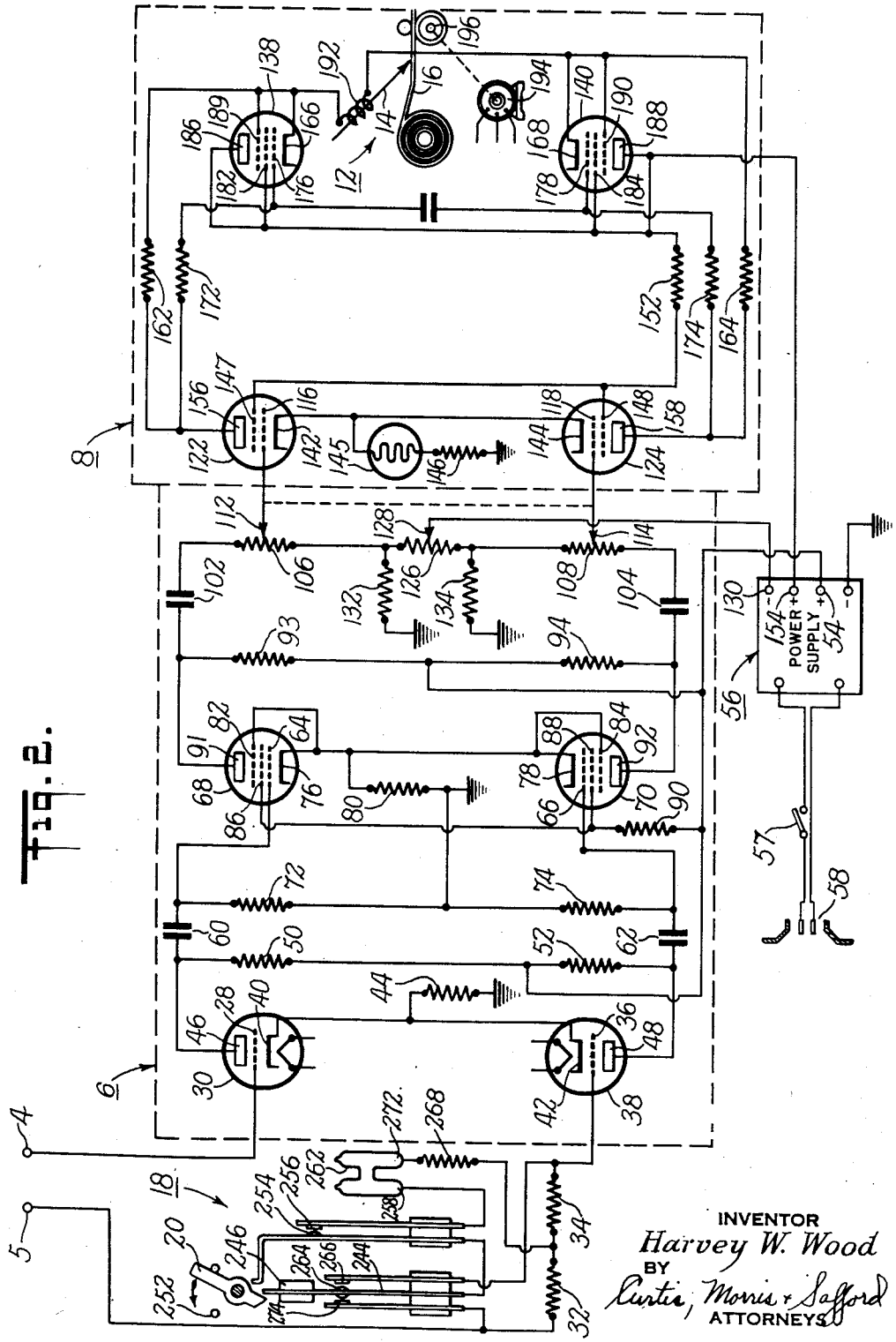

Patented Oct. 13, 1953

2,655,425

UNITED STATES PATENT OFFICE 2,655,425

ELECTROCARDIOGRAPH

Harvey W. Wood, Ossining, N. Y., assignor to Cambridge Instrument Company, Inc., New York, N. Y.

Application February 25, 1950, Serial No. 146,255

9 Claims. (Cl. 346—23)

This invention relates to the calibration of electrocardiographs and like electrical recording equipment. More particularly it relates to apparatus for making calibrating or test marks on the record sheet of direct-recording instruments, as distinguished from photographic type recorders.

A cardiographic record of heart conditions is obtained by plotting voltages developed in the human body. Such plots are often obtained by photographic systems employing string galvanometers. Apparatus of this type produces an excellent record, but because the trace is invisible until the photographic film is processed, the results of the electrocardiographic examination are not immediately available.

Thus, there are obvious advantages of direct-recording electrocardiographs, in which the voltage from the patient is amplified electronically and used to drive a recorder, in which a pen, or other type of stylus, traces the electrocardiogram on a moving sheet or strip. The unit can be constructed with such small dimensions that it can be conveniently carried about, and it does not require the use of film processing apparatus, the graph being immediately visible as it is being traced.

A direct-recording system of this type, is useful even though it will not provide as accurate data as the more precise photographic systems, and it is not a complete replacement for the photographic system, but rather is a valuable adjunct for use in connection therewith.

The electrocardiogram must not only accurately represent the body voltages, but it must present the data so that it can be interpreted readily in terms of set standards, so that some system of calibration must be provided on the record. In the best electrocardiographs of the photographic type, time reference lines are provided by periodically interrupting a light beam, so that time reference lines are accurately interrelated independently of other variations, such as the speed of the film.

In stylus recorders, reference marks are usually printed on the chart paper on which the electrocardiogram is to be inscribed. The accuracy of the calibration of the reference marks representing the time axis of the graph depends upon the speed with which the chart paper moves past the recording stylus.

It is not commercially practical to rely on a so-called constant-speed chart-driving system to maintain the necessary accuracy. Such drive systems are expensive, and are not readily incorporated in portable equipment in which the frequency and voltage of the available power sources may vary to considerable extent. Moreover, even if the chart-driving system did maintain a constant speed, it would be necessary to take precautions against errors such as would be caused by dimensional changes in the chart paper after the reference marks had been printed on it, for example, because of humidity changes.

In accordance with the present invention, a system is provided for recording calibrating marks directly upon the electrocardiogram. The invention contemplates the use of a mechanically oscillating body for controlling the application of a calibrating voltage to cause periodic deflections of the recording stylus. These calibrating marks can be correlated readily with any time reference marks printed on the chart to check the accuracy or to establish suitable correction factors to be applied when the chart is interpreted. Another aspect of the invention is directed to the provision of a standard calibrating voltage, which is applied and controlled by the mechanically oscillating body, so that the amplitude of the calibrating marks will serve as a basis for voltage calibration of the instrument. Another aspect of the invention relates to the arrangement of a single device to produce both voltage and time calibration. Another aspect of the invention relates to the application of the calibrating marks in the form of substantially square waves to provide simultaneous information regarding the performance of the amplifier. Another aspect of the invention relates to the automatic discontinuance of the calibrating marks after a desired period of time. Still another aspect of the invention relates to an arrangement which permits the instrument to be calibrated while the patient is connected in the circuit.

In an illustrative embodiment of the invention, a vibrating reed alternately closes and opens two electric circuits which connect a source of standard voltage, first with one polarity and then with the opposite polarity, to an electronic amplifier which controls the deflection of a recording stylus.

These and other aspects, objects, and advantages of the present invention will be apparent from a consideration of the following description taken in conjunction with the accompanying drawings in which:

Fig. 1 is a perspective view of a portable electrocardiograph embodying the invention; and Fig. 2 shows, diagrammatically, the electrical circuits of the electrocardiograph shown in Fig. 1.

The electrocardiographic voltages are picked up by a conventional arrangement of contact electrodes (not shown) which are applied to the patient and connected to a plug 1 (Fig. 1) in the side of a carrying case 2 which houses the electrocardiograph. These voltages are applied to two input terminals 4 and 5 (Figure 2) of a two-stage, push-pull amplifier, generally indicated at 6. The amplified signal voltages control the balance of a vacuum-tube bridge circuit, generally indicated at 8, which operates a recording mechanism, generally indicated at 12. When the bridge circuit 8 is unbalanced by the application of patient voltages to the terminals 4 and 5, the bridge circuit causes lateral deflection of a recording stylus 14 (see also Fig. 1), which may be a pen, but which is shown in Fig. 1 as a heated stylus that produces a visible trace on a moving strip of heat-sensitive chart paper 16. A calibrating arrangement, generally indicated at 18 (Figure 2), is controlled by a rockably mounted lever 20 (see also Figure 1) and provides electrical impulses for producing time calibrating marks 21 on the chart paper 16 so that the distance between adjacent marks corresponds to a known time interval, and the amplitude of these calibrating marks represents a known voltage at the input to the amplifier 6. As shown in Fig. 1, the chart paper 16 is provided with printed reference marks 22 and 24 which correspond, respectively, to the time and voltage coordinates.

In the amplifier 6, the input terminal 4 is connected directly to a control grid 28 of an input tube 30, and input terminal 5 is connected through two series resistances 32 and 34 to a control grid 36 of an input tube 38. The cathodes 40 and 42 of these tubes are connected together and returned to ground through a common bias resistor 44.

The anodes 46 and 48 of the tubes 30 and 38 are connected, respectively, through two plate load resistors 50 and 52 to a positive terminal 54 of a conventional rectifier-filter power supply, indicated in block form at 56, which is connected through a switch 57 to a plug 58 (see also Fig. 1) by which the power supply is connected to the usual alternating current supply mains.

The signal voltages appearing at anodes 46 and 48 are coupled through two coupling condensers 60 and 62 to control grids 64 and 66, respectively, of two push-pull, voltage-amplifying tubes 68 and 70. Grid return circuits are provided by resistors 72 and 74 which are connected between grids 64 and 66, respectively, and ground. The cathodes 76 and 78 of these tubes are connected to ground through a common biasing resistor 80. The suppressor grids 82 and 84 of these tubes are connected to their respective cathode circuits, and the screen grids 86 and 88 are connected together and through a voltage-dropping resistor 90 to the positive terminal 54 of the power supply 56. Positive voltage is provided for the anodes 91 and 92 of these tubes through plate-load resistors 93 and 94, respectively, which are connected to the positive power supply terminal 54.

The signals appearing at anodes 91 and 92 are coupled, respectively, through two coupling condensers 102 and 104 to two sensitivity-control potentiometers 106 and 108, the adjustable contacts 112 and 114 of which are connected, respectively, to control grids 116 and 118 of bridge-amplifier tubes 122 and 124. The adjustable contacts 112 and 114 of the potentiometers 106 and 108 are ganged together mechanically and adjusted manually by means of a control knob 125 (Fig. 1), which controls the sensitivity of the amplifier system. This control arrangement is such that the magnitudes of the signals applied to the two grids 116 and 118, increase or decrease in unison. The other ends of potentiometers 106 and 108 are connected, respectively, to opposite ends of a potentiometer 126, the adjustable contact 128 of which is connected to a negative bias supply terminal 130 on the power supply 56. The ends of potentiometer 126 are connected also to ground through resistors 132 and 134.

The adjustable contact 128 of potentiometer 126 is adjusted by means of a positioning-control knob 135 (Fig. 1) and controls the lateral position of the recorded trace with respect to a center reference line 136. This adjustment simultaneously varies the bias voltages of the bridge amplifier tubes 122 and 124 in opposite directions, so that the relative currents through these tubes can be adjusted to secure the desired balance condition of the output bridge circuit 8 that controls the recording mechanism 12.

The two bridge amplifier tubes 122 and 124 are arranged, in conjunction with two auxiliary bridge tubes 138 and 140, to form a bridge network which drives the recorder 12. The cathodes 142 and 144 of the bridge-amplifier tubes 122 and 124 are connected together and to ground through a constant current ballast tube 145 in series with a fixed resistor 146. The ballast tube stabilizes the operation of the circuit against changes that would be caused by line voltage fluctuations.

The screen grids 147 and 148 of the tubes 122 and 124 are connected together and through a voltage-dropping resistor 152 to a second positive terminal 154 on the power supply 56, which is arranged to deliver a higher positive voltage than terminal 54. The anodes 156 and 158 of these tubes are connected through load resistors 162 and 164 to cathodes 166 and 168 of the two auxiliary bridge tubes 138 and 140, respectively, and also through isolating resistors 172 and 174 to control grids 176 and 178 of the tubes 138 and 140, respectively.

The screen grids 182 and 184 of the tubes 138 and 140 are connected to the anodes 186 and 188, which are connected together and to the positive supply terminal 154. The suppressor grids 189 and 190 are connected to the cathode circuits of the respective tubes. A galvanometer coil 192 of the recorder 12 controls the deflection of the stylus 14 and is connected between the cathodes 166 and 168 of the auxiliary tubes 138 and 140.

With this arrangement the tubes 138 and 122 are effectively connected in series to form one branch of the bridge, and tubes 140 and 124 are effectively connected in series to form the other branch of the bridge circuit. So long as the bridge amplifier tubes 122 and 124 carry equal currents, and the two auxiliary tubes 138 and 140 are carrying equal currents, no voltage will appear between the cathodes 166 and 168 of tubes 138 and 140, and no current will flow through the galvanometer coil 192. However, if the control grid, say, of the first bridge amplifier tube 122, becomes more positive, the plate current flowing through this tube increases, increasing the voltage drop across the resistor 162 and causing an increased negative voltage on control grid 176 of the auxiliary tube 138 with respect to its cathode 166. This increase in negative bias increases the effective plate impedance of tube 138 and reduces the flow of current through that tube.

However, with a balanced signal, as the grid 116 of the tube 122 becomes more positive, the grid 118 of the other bridge amplifier tube 124 becomes more negative by a corresponding amount, and accordingly the plate current of this tube is decreased, thus reducing the voltage drop across the load resistor 164, and driving grid 178 of auxiliary tube 140 in a positive direction to reduce the effective plate impedance of the latter tube. It is now seen that the effect of a signal having the above polarity is to reduce the plate impedances of tubes 122 and 140 and to increase the plate impedances of tubes 124 and 138. Thus, the principal current flows from power supply terminal 154 through the tube 140, the galvanometer coil 192, the load resistor 162, and the tube 122 to ground. When the polarity of the applied signal is reversed, the plate impedance of the tubes 124 and 138 is decreased and the plate impedance of the tubes 122 and 140 is increased correspondingly, so that current flows through coil 192 in the opposite direction. The input signal controls only the bridge amplifier tubes 122 and 124, which, in turn, respectively, control the auxiliary tubes 138 and 140. Thus, the impedances of all four arms of the bridge arrangement are simultaneously controlled, providing maximum efficiency and maximum variation in current through the galvanometer coil 192 with minimum energy dissipation in the circuit. This arrangement provides its greatest advantages when the bridge circuit drives a current-operated device, such as the recorder 12.

In order to pull the chart paper 16 past the stylus 14, an electric motor 194 is provided which drives a roller 196 that is in frictional contact with paper 16.

Calibration of the recorder is provided according to the present invention by a reed, indicated diagrammatically at 244, which is uniformly resilient throughout its length, and which is supported at one end with its opposite end free. When deflected and released the reed vibrates with simple harmonic motion having a predetermined period. As shown, a weight 246 is added to the end of the reed with the effect of lengthening its period. When this reed is set in motion it periodically and alternately closes two electrical circuits, at a rate depending upon the natural period of the reed 244, and its pendulum weight 246. These circuits intermittently impress a standard voltage on the recording element so that a series of transverse lines, comprising the continuous square-wave calibrating pattern 21, are recorded on the chart paper 16, the amplitude of the waves representing the predetermined and known input voltage and the spacing between corresponding points on successive waves indicating a predetermined and known time interval.

In order to deflect the reed to initiate the vibration, the control lever 20 is pivotally mounted so that it can be conveniently rotated manually in the direction indicated by the arrow until it strikes a stop 252. As the lever 20 is rotated it deflects the reed 244 toward the right, as viewed in Fig. 2, and then slides over the end of the reed to release it and permit its harmonic vibration. The lever 20 also closes switch contacts 254 and 256 and maintains them in this position so long as the lever 20 is in its counter-clockwise position. During the calibration the input terminals 4 and 5 may be short-circuited. However, it is an advantage of the present arrangement that the apparatus can be calibrated while the patient is connected in the circuit, thus precluding any possibility of changes occurring between the time the calibration marks are made and the time the electrocardiogram is made.

The circuit as shown assumes the patient to be in the circuit during calibration so that the usual ground return is provided through the right leg of the patient. However, as pointed out above, the input terminals can be short-circuited and a suitable ground return circuit provided through a resistor.

The calibrating circuit can be traced from a terminal 258 of a standard galvanic cell 262, or other source of voltage of known potential, through the switch contacts 254 and 256 to the vibrating reed 244 which carries a contact 264 that, when the reed vibrates to the right, as viewed in Fig. 2, makes contact with a contact member 266 to complete the circuit through the load resistor 34 and a current-limiting resistor 268 to the other terminal 272 of the standard cell 262.

When the reed 244 vibrates to the left, as viewed in Fig. 2, reed contact 264 makes contact with a contact member 274, completing the circuit from terminal 258 of the standard cell 262 through the reed 244, the contact member 274, the load resistor 32 and the current-limiting resistor 268 to the other terminal 272 of the standard cell 262. Thus, when the reed 244 is deflected to the left, the voltage of standard cell 262 is impressed across the resistor 32, and thus is applied to the amplifier input with a first polarity, and when it is deflected in the opposite direction this voltage is impressed across resistor 34, and thus again applied to the input circuit, but with reversed polarity. In this manner, the voltage from the standard cell 262 is applied to the input circuit, first with one polarity and then with the reverse polarity, and at a rate dependent upon the natural period of reed 244. The reed in this case is representative of the well understood class of devices which vibrate or alternate with harmonic oscillation. Obviously, others of this class such as a pendulum in any of its various forms, a balance wheel and hairspring, etc., may be used; but I have found particular advantage in the rugged simplicity and permanent stability of the reed as shown.

It is apparent that the standard voltage will be impressed on the input circuit only so long as the lever 20 is maintained in its counter-clockwise position to hold the contacts 254 and 256 in engagement, and that when the lever is released, to return to its original position, the standard voltage will no longer be impressed upon the input circuit. In addition, the arrangement of the rotatable lever 20 is such that the reed 244 is given the same initial deflection each time the lever is rotated.

The maximum number of calibration marks that will be recorded depends upon the length of time the lever is maintained in its counter-clockwise position or upon the time the reed 244 sustains sufficient vibrating amplitude. If additional calibrating marks are desired, the lever 20 is merely returned to its initial position and again rotated in a counter-clockwise direction, and if less than the full number of calibrating cycles is desired, the lever 20 is returned to its initial position, thus opening the contacts 254 and 256 to prevent the standard voltage from being impressed upon the input circuit.

With this arrangement, the time and voltage calibration of the instrument can be checked quickly and rapidly whenever it is desired to do so, irrespective of whether the patient is in or out of the circuit.

The calibration system described above also provides a check on the performance of the amplifier. The calibration signal generated by the vibrating reed is a substantially square wave form, and the repetition frequency is relatively low, a few cycles per second, so that by observing the recorded wave form a fair idea of the frequency response characteristics of the amplifier can be obtained.

Thus, by operation of a single control knob the technician can simultaneously inscribe accurately controlled time and voltage calibration marks upon the electrocardiogram.

I claim:

1. In an electrocardiograph, or the like, calibrating apparatus comprising an electronic amplifier having input and output circuits, a recorder connected to said output circuit for recording the magnitude of the voltage applied to said input circuit as a function of time, a source of standardizing potential, a resilient vibratable member, manually controlled means for initiating vibration of said member, a circuit for coupling said standardizing source to said input circuit, said circuit being normally-open at said vibratable member and at said manual initiating means, first switch means, under the control of said initiating means, for closing said circuit at that point, and second switch means, under the control of said vibratable member for periodically completing said circuit thereby to apply a periodic standardizing voltage to said input circuit.

2. In an electrocardiograph, or the like, calibrating apparatus comprising an electronic amplifier having input and output circuits, an indicator connected to said output circuit for indicating the magnitude of the voltage applied to said input circuit as a function of time, a source of standardizing potential, a harmonically moving element, a first, normally-open circuit for coupling said standardizing source to said input circuit with a first polarity, a second, normally-open circuit for coupling said standardizing source to said input circuit with a second polarity, first and second switch contacts under the control of said harmonically moving element for alternately completing said first and second circuits, thereby to apply a standardizing voltage of periodically reversing polarity to said input circuit.

3. In an electrocardiograph, or the like, calibrating apparatus comprising an electronic amplifier having input and output circuits, a recorder connected to said output circuit for recording the magnitude of the voltage applied to said input circuit as a function of time, a source of standardizing potential, a vibratable reed, manually controlled means for initiating vibration of said reed, a circuit, normally-open as at said reed and at said manual means, for coupling said standardizing source to said input circuit, first switch means, under the control of said initiating means, for closing said circuit at that point, and second switch means, under the control of said vibrating reed for periodically closing said circuit thereby to apply a periodic standardizing voltage to said input circuit at predetermined time intervals and thus to calibrate both the time and voltage coordinates of the record produced.

4. In an electrocardiograph, or the like, calibrating apparatus comprising an electronic amplifier having input and output circuits, a recorder connected to said output circuit for indicating the magnitude of the voltage applied to said input circuit as a function of time, a source of standardizing potential, a vibrator reed, a manually controlled movable arm for initiating vibration of said reed, a first, normally-open circuit for coupling said source to said input circuit with a first polarity, a second, normally-open circuit for coupling said source to said input circuit with a second polarity, a first switch member under the control of said arm for partially completing said first and second circuits, second and third switch members under the control of said harmonically moving element for alternately completing said first and second circuits, thereby to apply a standardizing voltage of periodically reversing polarity to said input circuit.

5. Apparatus as described in claim 4 wherein said second and third switch members are spaced on opposite sides of the relaxed position of said reed, a distance corresponding to a fraction only of the amplitude initially established by said movable arm, whereby they make contact only during an initial fraction of the time during which it is vibrating.

6. Apparatus as described in claim 3 including a weight supported by said reed for increasing its period.

7. In an electrocardiograph, or the like, standardization apparatus comprising a resilient reed-like member, one end thereof being rigidly mounted and the other end free to vibrate, a weighted member carried by said reed for increasing the natural period of said reed, a standard cell, a first, normally-open circuit for coupling said standard cell to said input circuit with a first polarity, a second, normally-open circuit for coupling said standard cell to said input circuit with a second polarity, a manually-operable, rotatably-mounted lever positioned adjacent said reed and arranged to deflect and then release said resilient reed upon rotation thereof in a first direction, a switch responsive to said rotation of said lever for partially energizing said first and second circuits, and first and second contact members positioned on opposite sides of said reed and spaced therefrom and adapted alternately to complete said circuits in response to vibration of said reed, thereby to apply constant-voltage constant-frequency pulses of reversing polarity to said input circuit.

8. In an electrocardiograph, or the like, time and magnitude calibrating apparatus including an electronic amplifier having input and output circuits, manual means for varying the amplification of said amplifier, a recorder connected to said output circuit for indicating the magnitude of the voltage applied to said input circuit as a function of time, said recorder including a continually moving record medium and means for feeding said recording medium, a standard cell, a harmonically moving element independent of said record medium feeding means, and circuit means under the control of said element for periodically connecting said standard cell to and disconnecting it from said input circuit for producing a series of voltage pulses, thereby to permit adjustment of said amplification control means and calibration of said record feeding means in accordance with predetermined calibration standards.

9. In an electrocardiograph, or the like, wherein a trace is produced on a moving record medium having a center reference line, apparatus for calibrating the time and magnitude scales of said trace and for centering said trace on said record medium, said apparatus including an amplifier having input and output circuits, manual means for adjusting the amplification of said amplifier, a recorder including said moving record medium and having means for feeding said medium, said recorder being connected to said output circuit for producing said trace on said medium indicating the magnitude of the voltage applied to said input circuit as a function of time, manual means for adjusting the lateral position of said trace with respect to said center line, a standard cell, a vibratable reed, manual means for initiating vibration of said reed, a pair of switch means under the control of said reed and responsive to the excursions of said vibrating reed in opposite directions for periodically connecting said standard cell to and disconnecting it from said input circuit, said switch means being arranged to make said connections with successively opposite polarity for producing a series of square wave voltage pulses for operating said recorder to produce a trace having time calibrating marks crossing said center reference line, thereby to calibrate the speed of said record feed means and to permit adjustment of said amplification control means and said lateral position adjustment means in accordance with the trace produced by said recorder in response to said voltage pulses.

HARVEY W. WOOD.

References Cited in the file of this patent

UNITED STATES PATENTS

| Number | Name | Date |
| --- | --- | --- |
| 2,124,208 | Paully | July 19, 1938 |
| 2,170,515 | Dionne et al. | Aug. 22, 1939 |
| 2,436,720 | Jones | Feb. 24, 1948 |
| 2,439,640 | Traugott | Apr. 13, 1948 |
| 2,516,520 | Lamport et al. | July 25, 1950 |
| 2,571,223 | Edinburg | Oct. 16, 1951 |